Oct. 27, 1964 F. L. KOLM 3,154,372

FLEXURE MOUNTING PLATE

Original Filed Aug. 13, 1962

INVENTOR
FREDERICK L. KOLM
BY
Christie, Parker & Hale
ATTORNEYS.

United States Patent Office 3,154,372
Patented Oct. 27, 1964

3,154,372
FLEXURE MOUNTING PLATE
Frederick L. Kolm, Encino, Calif., assignor to Consolidated Electrodynamics Corporation, Pasadena, Calif., a corporation of California
Continuation of application Ser. No. 216,511, Aug. 13, 1962. This application Dec. 16, 1963, Ser. No. 332,333
7 Claims. (Cl. 346—145)

The invention relates to tape transport systems and, more particularly, to a flexure mounting plate for adjustably mounting a pair of magnetic transducer heads upon a tape transport. This application is a continuation of application Serial No. 216,511, filed August 13, 1962, now abandoned.

In many instances, it is necessary that magnetic transducer heads be precisely aligned with reference to the magnetic recording medium. For example, in digital applications of high track density recording, each head may write or read upon a plurality of different channels, or tracks, upon magnetic tape. Thus each head may be provided with a plurality of writing gaps, or reading gaps, arranged in a row and required to be positioned adjacent the desired channels. Frequently, two heads are used with their respective channels interleaved on the tape. The row of gaps of each head must, therefore, ordinarily be disposed perpendicular to the path of tape motion, in order that the desired spacing between the channels may be maintained.

Because of the very precise measurements and tolerances involved, normal variations in manufacture of tape transports and transducer heads make it desirable that each transducer head be adjustable in position after mounting, so as to be precisely aligned with reference to the tape. It is also desirable that each of two heads, for example, be independently alignable so that a change in the position of one head does not affect the precise alignment of the other.

Heretofore, such adjustability has been obtained, if at all, by the use of hinged mounting plates. In order to provide for precision alignment, the hinges of such mounting plates were required to be very exactingly made. Manufacture and assembly of such hinged mounting plates is very time consuming and expensive. In use, hinge wear, breakage, or malfunction can cause breakdown of the entire tape system by impairing the channel alignment of the attached head, and an expensive replacement is required.

This invention resolves the foregoing difficulties by providing a relatively inexpensive mounting plate of extremely high precision and reliability, permitting accurate and independent adjustability of two magnetic transducer heads carried thereby.

Briefly, the flexure mounting plate according to the present invention provides a base adapted to be attached to the tape transport, first and second side plates disposed adjacent opposite ends of the base, each adapted to carry a magnetic transducer head, and first and second support members, each support member joining an end of one side plate to an end of the base. The side plates are separated from the base so that there is a portion of each support member disposed between the adjacent side plate and the base, which are disposed on opposite sides of the support member. The support members are made from a springy material and are adapted to flex more easily than the adjacent side plates in response to forces applied to the side plates. Such flexure occurs in the portion of each support member disposed between the side plate and the base, which portion may therefore be referred to as a flexing portion. Thus the side plates are permitted limited rotation about an axis defined by the midsection of the flexing portion of the adjacent support member, so that the magnetic transducer head carried thereby is adjustable in position with reference to the path of the recording medium. It is an important feature of the present invention that such a flexure mounting plate may be made as a single piece, completely eliminating any necessity for assembly and also eliminating any moving parts subject to wear and breakage.

This invention may be more completely understood with reference to the accompanying drawings, in which.

Figure 2:
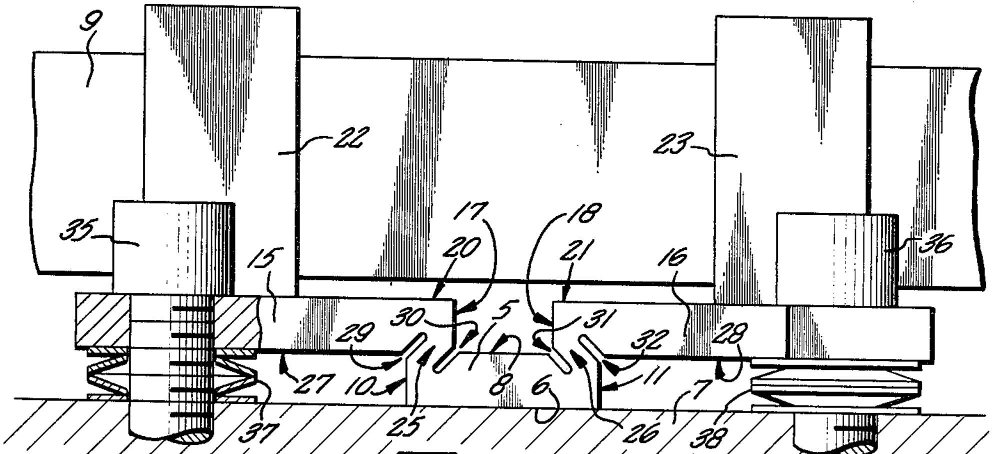
FIGURE 2 is a side view, partially cut away, of the flexure mounting plate shown in FIGURE 1.
Figure 1:
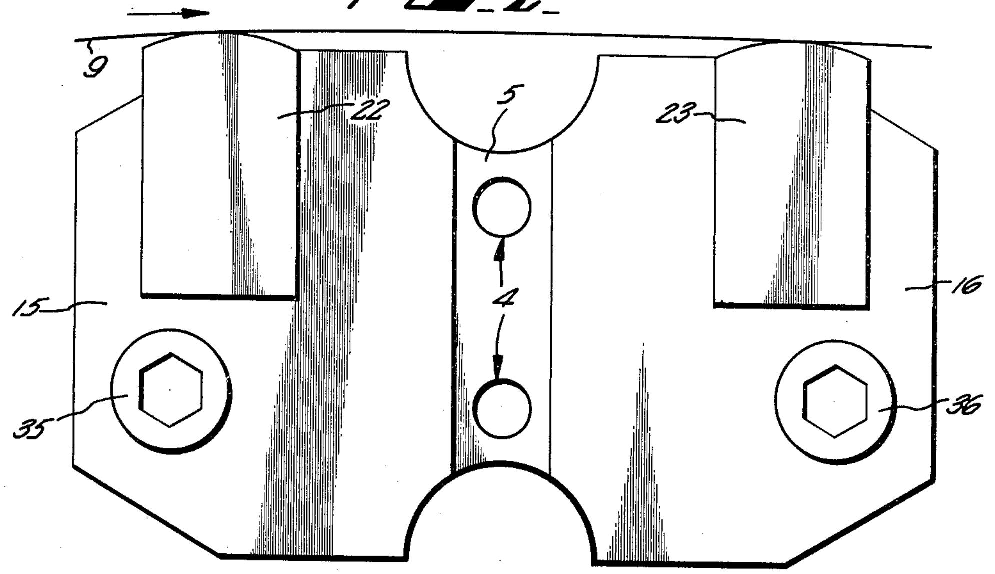
FIGURE 1 is a plan view of a flexure mounting plate according to the present invention carrying two magnetic transducer heads.

Referring now to FIGURES 1 and 2, the preferred embodiment of the present invention is shown, wherein the mounting plate is comprised of a single piece of material. Two bolts 4 secure a base 5 so that its bottom surface, indicated generally at 6, is adjacent the tape transport 7. The base 5 in this preferred form is substantially flat, having a top surface indicated generally at 8 opposite the bottom surface 6. The base 5 has first and second ends 10 and 11, respectively, which are straight and parallel, being disposed generally perpendicular to the path of motion of the adjacent magnetic tape 9.

A first side plate 15 is disposed generally adjacent the first end 10 of the base 5, and a second side plate 16 is disposed generally adjacent the second end 11 of the base 5. Side plates 15 and 16 are substantially identical flat plates whose top surfaces 20 and 21, respectively, are each adapted to carry one of the magnetic transducer heads 22 and 23. The heads 22 and 23 are arranged adjacent the tape 9 for recording or reading information upon a plurality of channels thereon. Side plate 15 includes a bottom surface 27 substantially parallel to its top surface 20, and an inner end 17 arranged adjacent the base 5 and parallel to the first end 10 of the base 5. Side plate 16 similarly includes a bottom surface 28 and an inner end 18 arranged adjacent the base 5 and parallel to the second end 11 of the base 5.

A first support member 25 joins the inner end 17 of the first side plate 15 to the base 5 adjacent base first end 10, and a second support member 26 similarly joins the inner end 18 of the second side plate 16 to the base 5 adjacent the base second end 11.

In the preferred form, side plates 15 and 16, support members 25 and 26, and base 5 are all integral, being formed from and comprising a single piece of material. The side plates 15 and 16 are so arranged that each overlaps a portion of the base 5 and is also raised above the base 5. The bottom surfaces 27 and 28 of side plates 15 and 16 respectively, are level with the top surface 8 of the base 5. The inner ends 17 and 18 of side plates 15 and 16 are thereby disposed adjacent and perpendicular to the top surface 8 of the base 5, while the first and second ends 10 and 11 of the base 5 are adjacent and perpendicular to the side plate bottom surfaces 27 and 28, respectively.

The support members 25 and 26 comprise a portion of the base 5 and of the adjacent side plates 15 and 16, and each is defined by a pair of oppositely disposed parallel undercut slots. For example, support member 25 is defined by a pair of slots indicated generally at 29 and 30. Slot 29 is an angular undercut slot defined by side plate 15 along the points of intersection of the first end 10 of the base plate 5 with the bottom surface 27 of side plate 15. Slot 29 is parallel to both base end 10 and side plate inner end 17. Slot 29 extends inwardly into side plate 15 in an angular direction toward the side plate inner end 17. Slot 30 is defined by the base 5 and is disposed along the points of intersection of side plate inner end 17 with the base top surface 8. In order that symmetry may be maintained, as discussed below, slot 30 must be parallel to slot 29, extending within the base 5 in an angular direction opposite that of slot 29. Therefore, when slot 29 extends angularly toward side plate inner end 17 at an angle of 45°, slot 30 must extend angularly toward the base first end 10, which is parallel to side plate inner end 17, at a like 45° angle. Support member 26 is similarly defined by the pair of slots 31 and 32, having the same relationship to one another as slots 29 and 30.

The overlap of the side plates 15 and 16 and the base 5 is such that when the two pairs of slots define the support members 25 and 26, each support member 25 or 26 has a thickness less than that of the adjacent side plates 15 or 16. The entire mounting plate in this embodiment is made from a springly metal, such as a hardened stainless steel, and therefore the thinner support members 25 and 26 are more easily flexed than the adjacent side plates 15 and 16. It is therefore important that each pair of slots 29 and 30 or 31 and 32 be symmetrically disposed, so that upon application of force to the adjacent side plate 15 or 16 to urge the same upwardly or downwardly, the adjacent support member 25 or 26 will flex evenly to permit limited rotation of the adjacent side plate about an axis defined by the midsection of the support members joined thereto. The portion of each support member 25 and 26 disposed between the pair of slots defining such support member may be referred to as the flexing portion thereof.

The width and depth of the slots 29, 30, 31, and 32 is not critical, but may be varied according to the hardness of the metal used and the extent of flexure desired, the necessary requirement being a symmetrical relationship between the two slots of each pair. Although the angle of slot inclination may be varied, it is preferable that a Z configuration be maintained, that is, for example, slot 29 being inclined toward side plate inner end 17 and slot 30 being inclined toward base first end 10. In the preferred form all slots are disposed at angles of substantially 45° to the adjacent surfaces and ends.

In the preferred form, force is applied independently to each of the side plates 15 and 16 for causing rotation thereof, by threaded bolts 35 and 36, each bolt passing through a side plate to the tape transport 7. Spring washers 37 and 38 may be provided between the side plates 15 and 16 and the tape transport 7. Other adjustment means may be provided, however, which will urge the side plates 15 and 16 upwardly or downwardly and hold the same in place at desired positions.

In operation, it will be apparent that when, for example, it is desired to align magnetic transducer head 22 into a position so that its gaps are precisely perpendicular to the path of motion of magnetic tape 9, bolt 35 may be rotated to urge side plate 15 upwardly or downwardly. In response to this urging, the flexing portion of support member 25 will flex, permitting limited rotation of side plate 15 about an axis defined by the midsection of support member 25, such rotation being limited by the elastic limits of the metal. Magnetic transducer head 22 will be carried by the side plate 15 and rotated as indicated by the arrows in FIGURE 2 until the desired perpendicular alignment has been attained. It will be apparent that extremely minute adjustments in alignment may be made in this manner.

Figure 3:
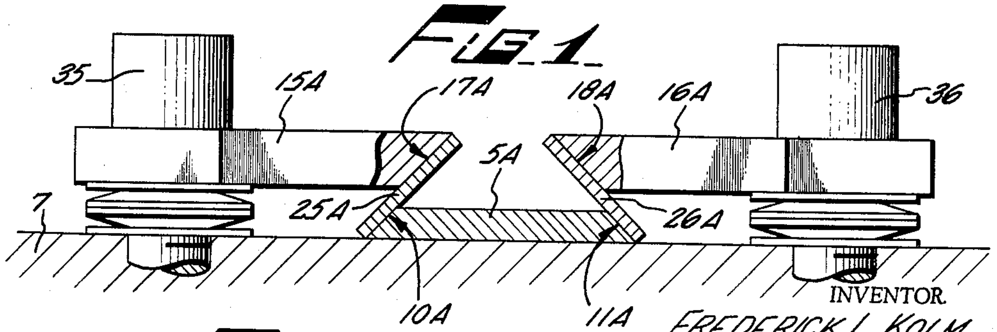
FIGURE 3 is a side view of another embodiment of a flexure mounting plate in accordance with the present invention.

In FIGURE 3 another embodiment of the present invention is shown, wherein the mounting plate is comprised of more than one piece of material. Corresponding numerals indicate like portions in the embodiment shown in FIGURES 1 and 2. A base 5A is attached to the tape transport 7. Its first and second ends 10A and 11A are angularly disposed at equal but opposite angles. Side plates 15A and 16A also have inner ends 17A and 18A angularly disposed, each inner end 17A or 18A being parallel to the adjacent first or second end 10A or 11A of the base 5. In this embodiment, the support members 25A and 26A comprise separate pieces, and are firmly attached in any suitable manner to the adjacent side plate 15A or 16A and base 5A. Support members 25A and 26A must be made of a material more easily flexed than the material from which side plates 15A and 16A are made. The flexing portion of each support member 25A and 26A is that portion of each between the portions thereof joined to the base 5A and the adjacent side plate 15A or 16A.

What is claimed is:

1. A mounting plate for supporting a magnetic transducer head in an adjustable position in relation to a tape transport frame, the mounting plate comprising a base plate adapted to be securely affixed to the tape transport frame, a side plate located on one side of the base plate, the magnetic head being secured to the side plate, and a flexible support member joining the side plate to the base plate, the side plate being offset from the base plate and adjacent edges of the base plate and the side plate being in overlapping relationship, and the flexible support member being thin compared to the base and side plates.

2. A flexure mounting plate for mounting a pair of magnetic transducer heads on a tape transport to be independently alignable with reference to a magnetic recording medium comprising a base having a bottom surface adapted to be attached to a tape transport, a top surface parallel to the bottom surface, two straight parallel ends, and a plurality of sides, first and second substantially identical side plates, each having an inner straight end disposed adjacent the base and parallel to the ends of the base, an outer end, a top surface adapted to carry a magnetic transducer head, a bottom surface parallel to the top surface, and a plurality of sides, first and second substantially identical support members made from a springy material, each of the support members being joined to one end of the base and also to the inner end of a side plate, and being disposed therebetween so that the base and the adjacent side plate extend on opposite sides of the support member, the side plates being separated from the base so that there is a flexing portion of each support member disposed between the portion thereof joined to the base and the portion thereof joined to the side plate, the flexing portion of each support member being adapted to be more flexible than the side plate joined thereto so that the flexing portion of the adjacent support member will be deformed in response to forces applied to the side plate joined thereto tending to raise and lower the said plate, in order to permit limited rotation of said side plate about an axis defined by the midsection of the flexing portion of the support member, the bottom surfaces of the side plates being disposed above the bottom surface of the base to permit movement of the side plates toward and away from the tape transport to which the bottom surface of the base is attached, and means cooperating with each side plate for selectively applying force to raise and lower the side plate.

3. A flexure mounting plate according to claim 2 wherein the base, the side plates, and the support members comprise a single piece of material.

4. A flexure mounting plate according to claim 3 wherein the single piece of material is a hardened metal having springy characteristics.

5. A flexure mounting plate according to claim 3 wherein the bottom surfaces of the side plates are level with the top surface of the base, the inner ends of the side plates are disposed above the top surface of the base, the ends of the base are disposed under the bottom surfaces of the side plates, and each of the support members comprises a portion of both the base and the adjacent side plate, being formed by the portions thereof disposed between a pair of substantially identical elongated slots, the first slot being defined by the bottom surface of the side plate, said slot extending across the said bottom surface adjacent the end of the base disposed thereunder, parallel to the inner end of the side plate, the second slot being defined by the top surface of the base, said slot extending across the top surface of the base adjacent the inner end of the side plate disposed thereover, and parallel to the ends of the base.

6. A flexure mounting plate according to claim 5 wherein each of the slots defined by the bottom surfaces of the side plates is inclined at an angle of substantially 45° to a projection of the surface defining the slot, each such slot extending toward the adjacent inner end of the side plate, and wherein each of the slots defined by the top surface of the base is inclined at an angle of substantially 45° to a projection of said top surface of the base, each such slot extending toward the adjacent end of the base.

7. In a tape transport having a frame plate substantially parallel to the edge of the tape, a mounting member for supporting a magnetic transducer head, the mounting member comprising a plate having a base portion and a head mounting portion integral with the base portion, means for securing the base portion to the frame plate, the mounting portion having a surface extending substantially parallel to the frame plate and spaced therefrom, the junction between the two portions having a pair of closely spaced parallel slots cut in from opposite sides, the slots lying in overlapping relationship, the overlapping slots forming a yieldable junction between the two portions of the mounting plate, and means for adjusting the spacing between the mounting plate portion and the frame plate by bending the mounting member in the region of the slots.

References Cited in the file of this patent

UNITED STATES PATENTS

| | | |
|---|---|---|
| 2,587,097 | Berlant | Feb. 26, 1952 |
| 2,859,084 | Raddin | Nov. 4, 1958 |
| 2,943,860 | D'Arcy | July 5, 1960 |

FOREIGN PATENTS

| | | |
|---|---|---|
| 842,509 | Great Britain | of 1960 |